United States Patent [19]
Howse

[11] Patent Number: 4,479,622
[45] Date of Patent: Oct. 30, 1984

[54] AIRCRAFT DOOR ARRANGEMENTS

[75] Inventor: Eric R. W. Howse, Christchurch, England

[73] Assignee: British Aerospace Public Limited Company, London, England

[21] Appl. No.: 466,476

[22] Filed: Feb. 15, 1983

[30] Foreign Application Priority Data

Feb. 19, 1982 [GB] United Kingdom ............... 8204916

[51] Int. Cl.³ .............................................. B64C 1/14
[52] U.S. Cl. .................................. 244/129.5; 49/246; 16/368
[58] Field of Search ............... 244/129.5, 118.1, 118.3; 49/246, 248, 249; 16/368, 369, 370

[56] References Cited

U.S. PATENT DOCUMENTS

| | | |
|---|---|---|
| 2,751,636 | 6/1956 | Heinemann et al. ............. 244/129.5 |
| 2,845,299 | 7/1958 | Pickering ............................. 16/370 |
| 2,931,599 | 4/1960 | McQuilkin ........................... 49/249 |
| 3,051,280 | 8/1962 | Bergman et al. ................. 244/129.5 |
| 3,085,297 | 4/1963 | Linderfelt ........................ 244/129.5 |
| 3,213,962 | 10/1965 | Clark, Jr. ............................ 49/249 |
| 4,199,120 | 4/1980 | Bergman et al. ................. 244/129.5 |
| 4,386,481 | 6/1983 | Jeppesen ............................. 49/248 |

Primary Examiner—Galen L. Barefoot
Attorney, Agent, or Firm—Cushman, Darby & Cushman

[57] ABSTRACT

An aircraft door arrangement for a pressure hull in which the door is positively prevented from being urged through the door aperture when closed, but which allows the door to move through the aperture to an open position, a carrier and an actuation arrangement being such to firstly both tilt and bodily move the door in its own plane to an intermediate position to clear abutments in the aperture and, secondly, to urge the door bodily through the aperture to lie in an open tilted position in which the door aperture is unobstructed.

5 Claims, 4 Drawing Figures

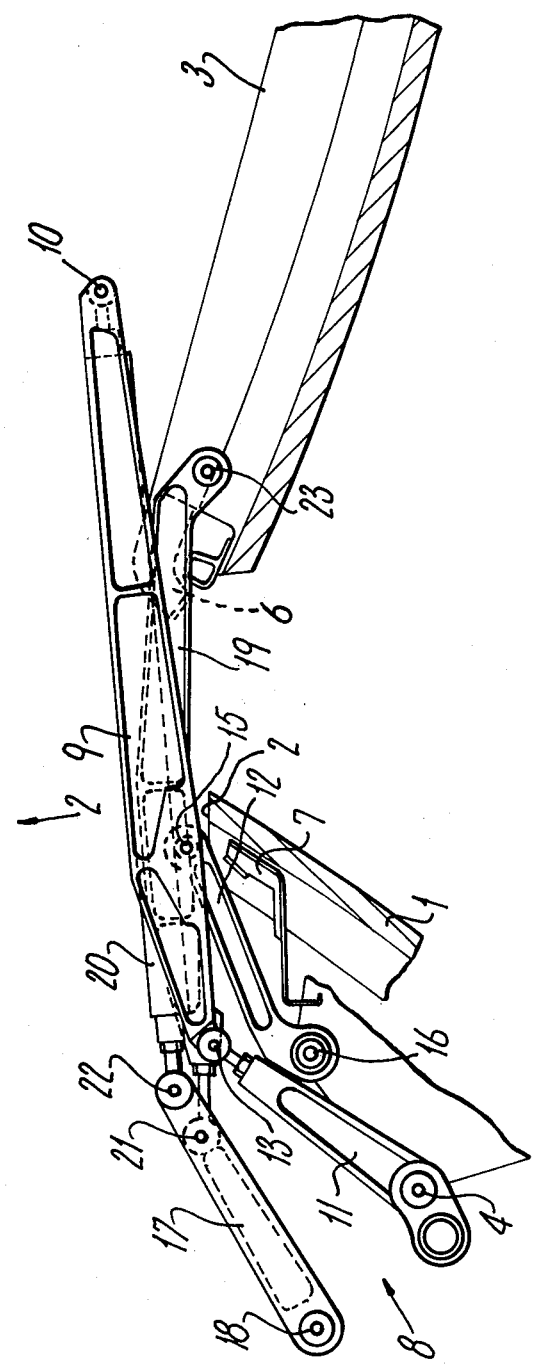

AIRCRAFT DOOR ARRANGEMENTS

This invention relates to arrangements for opening and closing doors such as personnel, cargo, or access doors in those aircraft where substantial pressure differentials can exist across the closed door.

In aircraft pressure hulls, plug type designs are commonly used, that is to say, the door has abutments which match abutments carried by the pressure hull structure defining the door aperture so that in the closed position the door is positively prevented from being urged through the aperture. However, due to such factors as the stowage space available, it is often necessary to move the door to an open position through the aperture.

The present invention has for an objective the provision of an improved arrangement to positively prevent the door being urged through the aperture when closed, but which allows it to move through the aperture to an open position.

According to one aspect of the present invention an aircraft door arrangement includes a pressure hull structure defining a door aperture, a door sized and shaped to be within the aperture when closed but able to pass therethrough when opened, oppositely spaced edge regions on the door, matching abutment regions on the hull structure aperture, said regions arranged to engage one another to prevent passage of the door through the aperture when in the closed position, carrier means pivotally anchored to the hull structure and carrying the door, and actuation means pivotally anchored to the hull structure and to the door, the carrier means and the actuation means cooperating with the door such that, in an opening sequence, the door firstly moves to clear the abutment regions and subsequently moves bodily through the door aperture to an open position.

Preferably, the carrier means comprises an arm pivoted at one end to the door and pivotally supported in the region of its other end by twin radius rods having their ends pivoted to the arm at spaced points and having their other ends pivoted to the hull structure at similarly spaced points. The arm means is thus supported by a generally parallel motion linkage.

Preferably, the actuation means comprises a crank rotatably carried at one end by the hull and pivotally carrying at a remote end region, the ends of two push-pull rods, the further ends of those two rods being pivotally connected to the door at spaced points. Rotation of the crank is by known motor means.

In this specification all pivots, hinges and rotational axes to which reference is made have their axes parallel to one another and lying transverse to the door aperture.

By this arrangement, with the door in the closed position, initial rotation of the crank is effective to cause the push-pull rods to draw the door on its carrier means to an intermediate position in which it clears the abutment regions of the aperture, and subsequent rotation of the crank is effective to cause the push-pull rods to urge the door bodily through the aperture on its carrier to the open position. Thus the crank is rotated in the same sense at all times during the opening sequence thus greatly simplifying the motor means.

One embodiment of the invention is described by way of example with reference to the accompanying drawings in which:

FIG. 4 is a similar view with the door arrangement in a fully open position.

Figure 1:
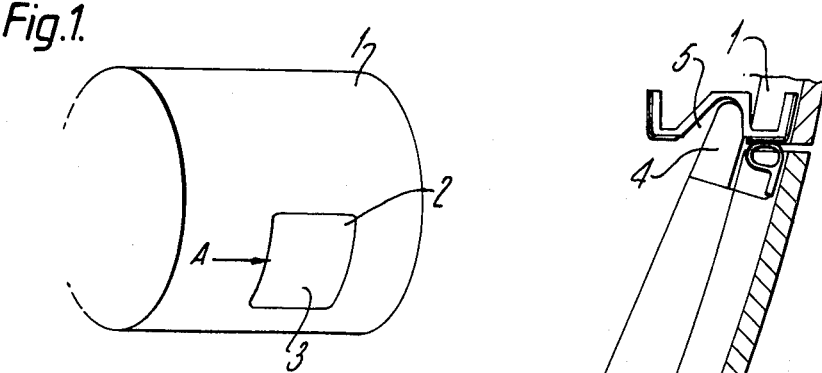
FIG. 1 is a perspective view of part of an aircraft pressure hull.

In the drawings, an aircraft pressure hull has structure 1 defining a generally rectangular door aperture 2. A plug-type door 3 closes this aperture. To prevent the door being forced outwardly, that is to say to the right as drawn, by internal pressure the door 3 has upper edge regions 4 which protrude into a channel 5 formed in the structure, and lower edge regions 6 which engage a lower lip 7 formed by the structure defining the aperture. The channels and the lip 7 provide abutment regions. Although not shown, side regions of the door and the aperture are sized to clear one another; thus when the abutments on the upper and lower edges of the door and the aperture are arranged to clear one another, the door may then pass through the aperture.

The door is bodily carried on the structure 1 by a carrier 8 comprising an arm 9 pivoted at one end to the door 3 about an axis 10 and pivotally supported on the structure at its other end by two spaced radius rods 11, 12. That referenced 11 is pivoted at one end to the arm at 13 and at the other end to the structure at 14, whilst that referenced 12 is pivoted at one end to the arm at 15, and at the other end to the structure at 16 the arrangement in effect providing a generally-parallel motion linkage.

For stability purposes, the elements 9, 11 and 12 are duplicated, one set being spaced from the other on opposite sides of the door. The duplicated elements are interconnected by transverse torque tubes, not shown. However, due to the choice of Figures this aspect is not shown.

Between the duplicated elements of the carrier lies an actuator mechanism. This comprises a crank 17 carried by the structure for rotation about an axis 18. Rotation is effected by a drive motor, not shown. At this remote end, the crank pivotally carries the ends of two push-pull rods 19, 20 respectively, that referenced 19 having it end pivoted at 21 whilst that referenced 20, having its end pivoted at 22. The respective further ends of rods 19 and 20 are pivoted to the door at 23 and 10.

Figure 2:
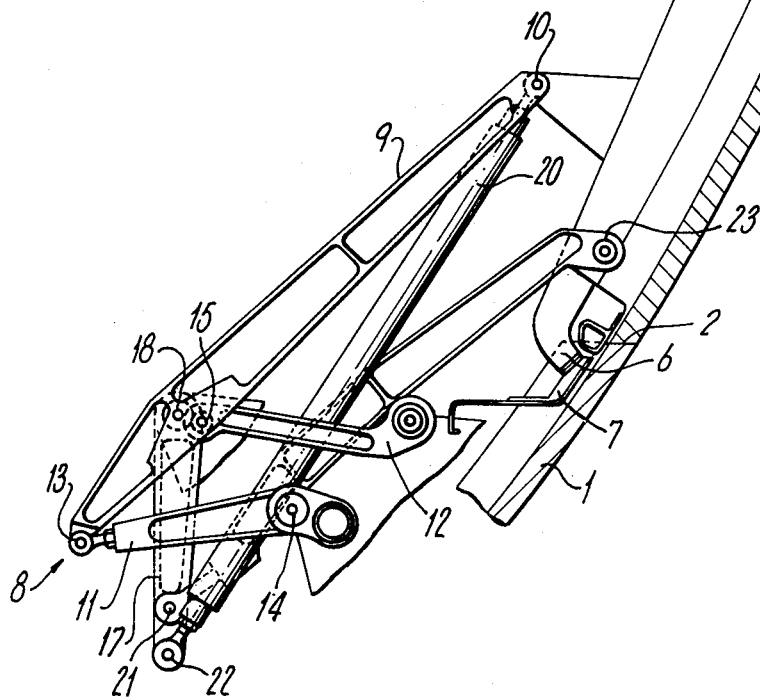
FIG. 2 is a diagrammatic partly sectioned end elevation of a door arrangement in a closed position, that is to say a view on Arrow A of FIG. 1.

Assuming the door 3 to be closed, that is to say, its upper edge regions 4 are engaged with the channel 5 and its lower edge regions 6 are engaged with the lip 7, as shown in FIG. 1, initial rotation of the crank 17 in a clockwise sense as drawn, causes the rods 18, 19 to draw the lower edge of the door, as drawn, inwards away from the lip 7 and simultaneously, or near simultaneously, to move the door bodily downwards generally in its own plane so that the upper edge regions 4 disengage the channel 5. Movement of the door is a combination of both bodily and tilting movement on its carrier to reach an intermediate position shown in FIG. 2 in which the door lies wholly within the hull structure. FIG. 2 illustrates the limit of the movements leading to the intermediate position wherein the crank 17 and the rod 20 are aligned with one another in a bottom dead-centre condition.

Figure 3:
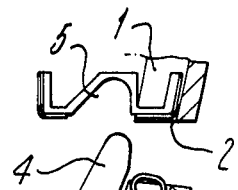
FIG. 3 is a similar view with the door arrangement in an intermediate position.
Figure 3:
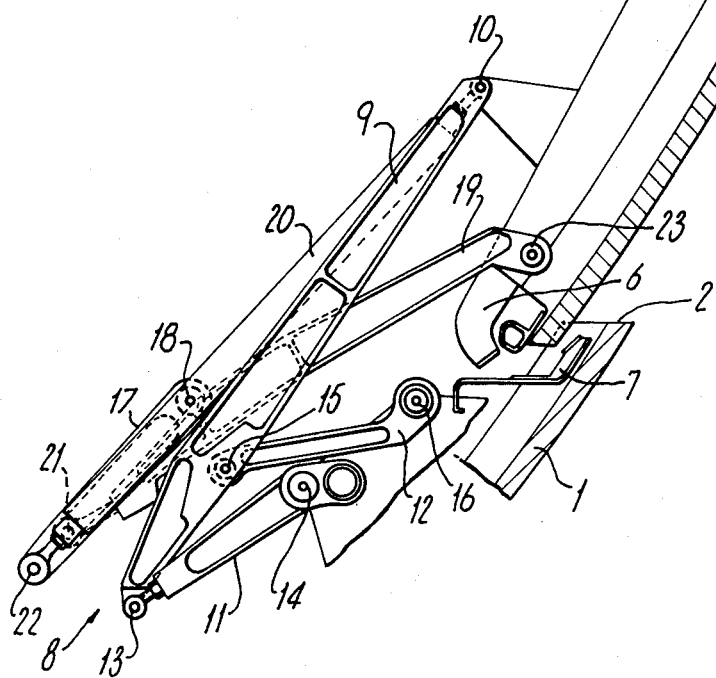

Further rotational movement of the crank 17 in the same sense causes the rods 18, 19 to urge the door bodily on its carrier through the aperture. In so doing the radius rods 11, 12 rotate clockwise, as drawn, about their pivots 15, 16 respectively, until the arm 9 and the rods 19 and 20 together protrude generally horizontally through the aperture with the door depending therefrom in a fully open position clear of the door aperture. This position is illustrated in FIG. 3.

Since the crank is rotated in one direction only during the opening sequence and in one direction only (i.e. in reverse) during the closing sequence, a greatly simplified drive motor control is necessary.

I claim:

1. An aircraft door arrangement, comprising:
   a pressure hull structure defining a door aperture;
   a door sized and shaped to lie within the aperture when closed but able to pass therethrough when opened;
   oppositely spaced edge regions on the door;
   matching abutment regions on the hull structure of the aperture, said regions arranged to engage one another to prevent passage of the door through the aperture when in the closed position;
   carrier means pivotally anchored to the hull structure and carrying the door; and
   actuation means pivotally anchored to the hull structure and to the door, the carrier means and the actuation means cooperating with the door such that, in an opening sequence, the door firstly moves to clear the abutment regions and subsequently moves bodily through the aperture to an open position; wherein
   the carrier means comprises an arm pivoted at one end to the door and pivotally supported in the region of its other end by twin radius rods having their ends pivoted to the arm at spaced points and having their other ends pivoted to the hull structure at similarly spaced points; and wherein
   the actuation means comprises a crank rotatably carried at one end by the hull structure, and said crank pivotally carrying at another end of two push-pull rods, the further ends of these two rods being pivotally connected to the door at spaced points.

2. An aircraft door arrangement according to claim 1, wherein the carrier means and the actuation means are arranged so that the movement to clear the abutment means is a combined bodily and tilting movement, the bodily movement being such as to move the door generally in its own plane and the tilting movement being such as to move one edge of the door generally inwards of the aperture.

3. An aircraft door arrangement according to claim 2, wherein the carrier means and the actuation means are arranged such that the movement of the door through the aperture is a combined bodily and tilting movement which brings the door into a fully open position outside the aperture.

4. An aircraft door arrangement according to claim 1, wherein one push-pull rod has its further end pivoted to the door co-axially with that end of the arm pivoted to the door.

5. An aircraft door arrangement according to claim 1, wherein the carrier means and the actuation means are such that the crank is rotated only in one sense to effect door opening and in the opposite sense to effect door closing.

* * * * *